Feb. 26, 1946. C. F. BACHLE 2,395,712
CYLINDER HEAD
Filed Jan. 12, 1942 5 Sheets-Sheet 1

INVENTOR
Carl F. Bachle
BY
Attorney

Feb. 26, 1946.   C. F. BACHLE   2,395,712
CYLINDER HEAD
Filed Jan. 12, 1942   5 Sheets-Sheet 2

INVENTOR.
Carl F. Bachle
BY
Attorney.

Feb. 26, 1946. C. F. BACHLE 2,395,712
CYLINDER HEAD
Filed Jan. 12, 1942 5 Sheets-Sheet 3
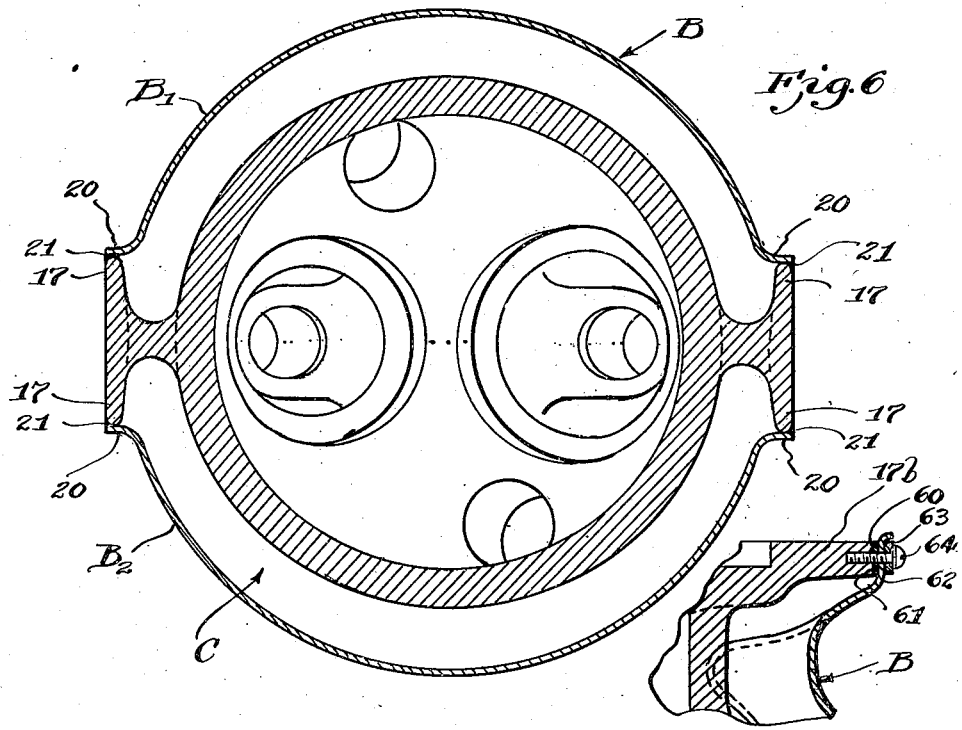
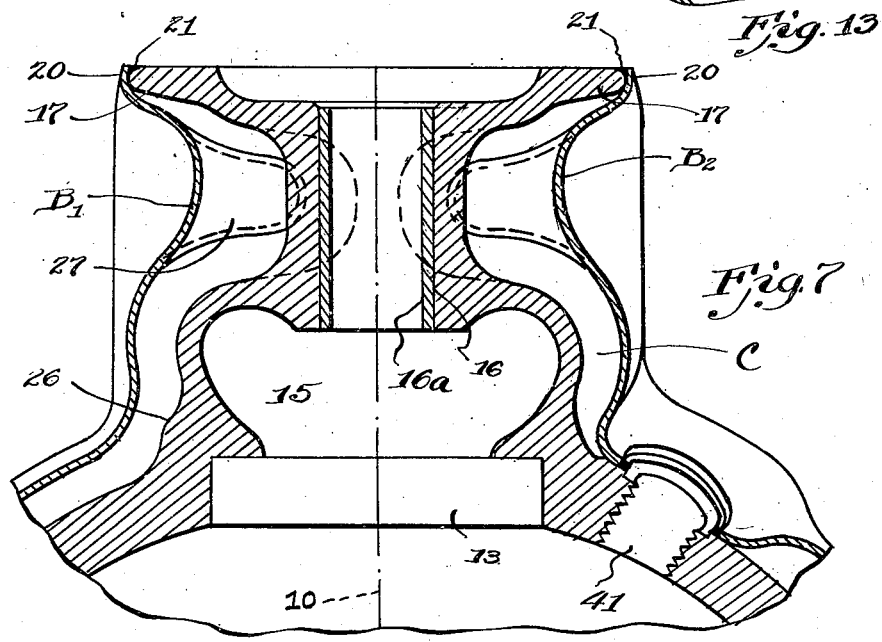
INVENTOR.
Carl F. Bachle
BY G. F. Hauke,
Attorney.

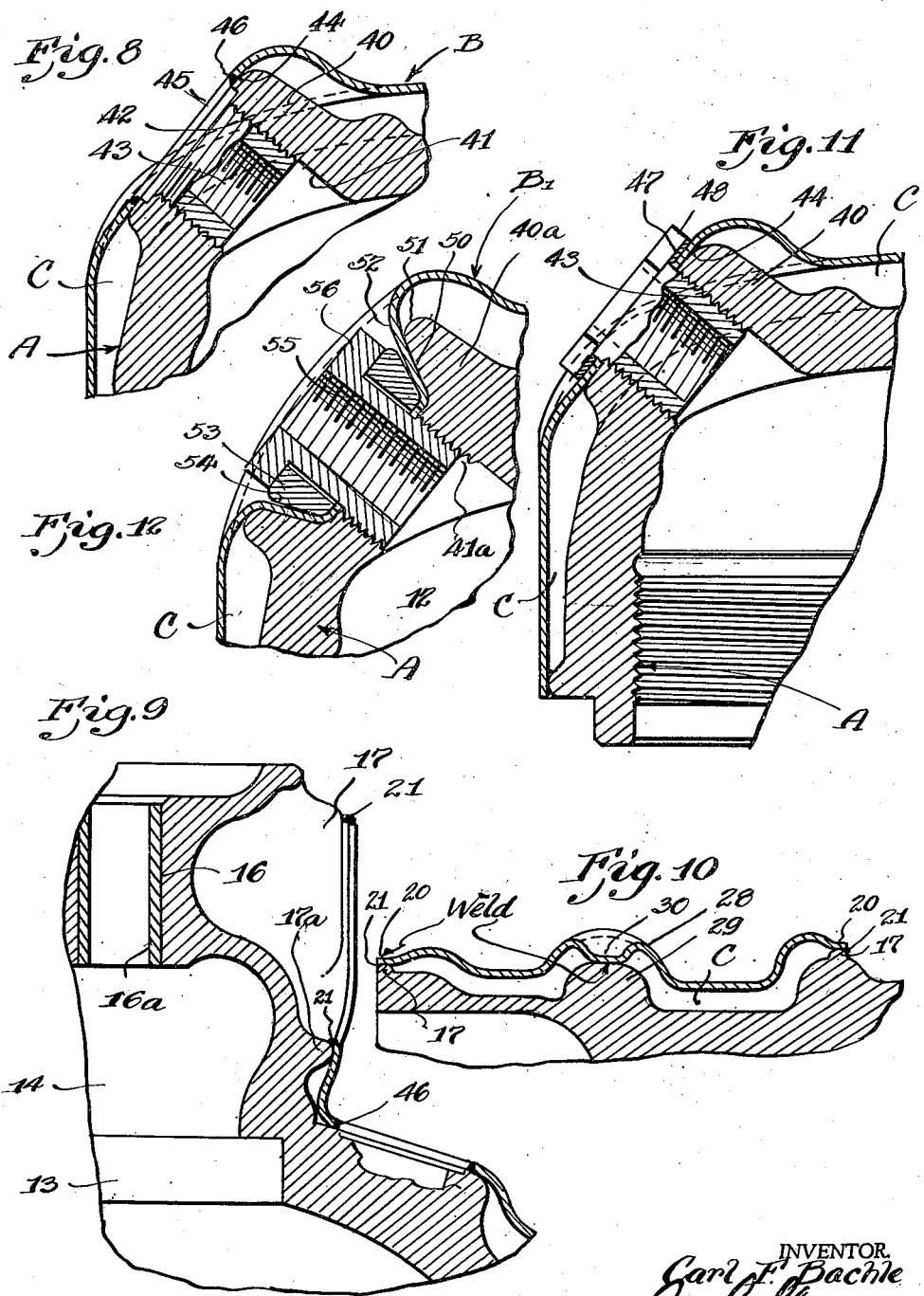

Feb. 26, 1946. C. F. BACHLE 2,395,712
CYLINDER HEAD
Filed Jan. 12, 1942 5 Sheets-Sheet 5

INVENTOR
Carl F. Bachle
BY
Attorney

Patented Feb. 26, 1946

2,395,712

UNITED STATES PATENT OFFICE 2,395,712

CYLINDER HEAD

Carl F. Bachle, Grosse Pointe, Mich., assignor to Continental Aviation & Engineering Corporation, Detroit, Mich., a corporation of Virginia Application January 12, 1942, Serial No. 426,457

19 Claims. (Cl. 123—173)

My invention relates to engines and more particularly to a cylinder head structure which is especially adaptable for use with aircraft engines of the liquid cooled type.

It is difficult to uniformly cast jacketed cylinderhead structures for liquid cooled aircraft internal combustion engines and still maintain minimum weight requirements with adequate strength for resisting stresses and strains. It is recognized that a forging is materially stronger and more dense than a casting, and the use of forgings is most generally preferred over castings in aircraft engines. However, integral jacket portions can not be forged into a cylinder head forging, and it is impractical if not impossible to machine such internal passages for the circulation of a cooling fluid in a cylinder head structure.

The object of my present invention is to construct an improved cylinder head structure by providing a composite cylinder head structure comprising a forged body portion and a sheet metal jacket structure formed of sheet metal stampings secured to the body portion.

Many of the difficulties attendant in a composite cylinder head structure suitable for aircraft engines have been eliminated by reason of my present design which incorporates various features which make the proposed structure practical and useable in connection with liquid cooled aircraft engines, since the cylinder head structure is composed for the most part of a forging which is relatively dense and exceedingly strong in resisting stresses and strains to which the cylinder head is subjected, but the entire assembly has a total weight which is at least equal to or less than the weight of a corresponding cast cylinder head structure.

Further objects of my invention relate to various features of the construction, which provide improved means for securing the sheet metal jacket stampings to the forged cylinder head body portion, whereby to provide a rigid structure that is light in weight, economical to manufacture and service, and in which engine design is facilitated.

Figure 1:
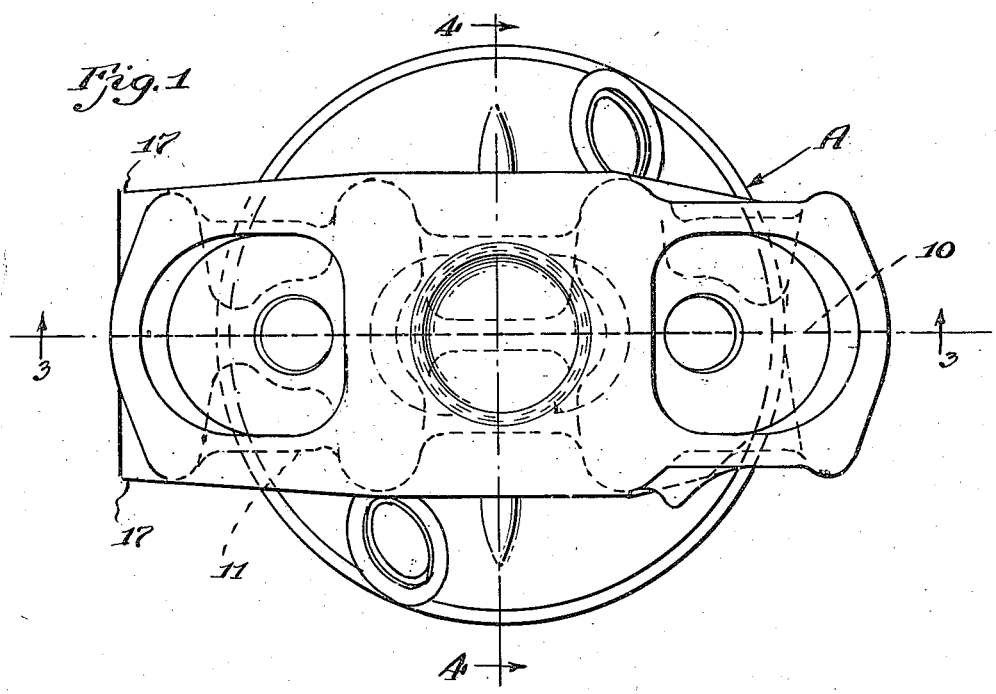
Figure 2:
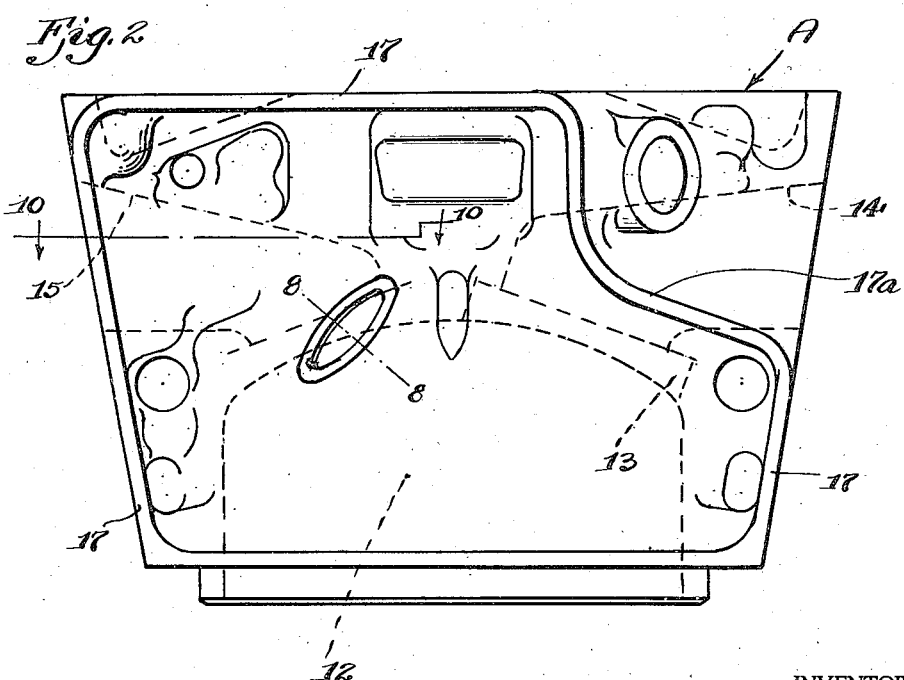
Figure 3:
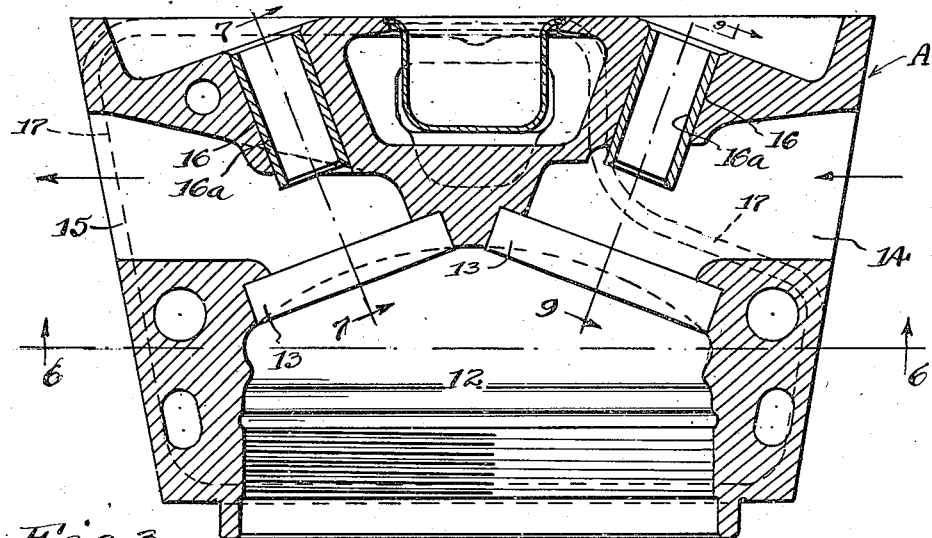
Figure 4:
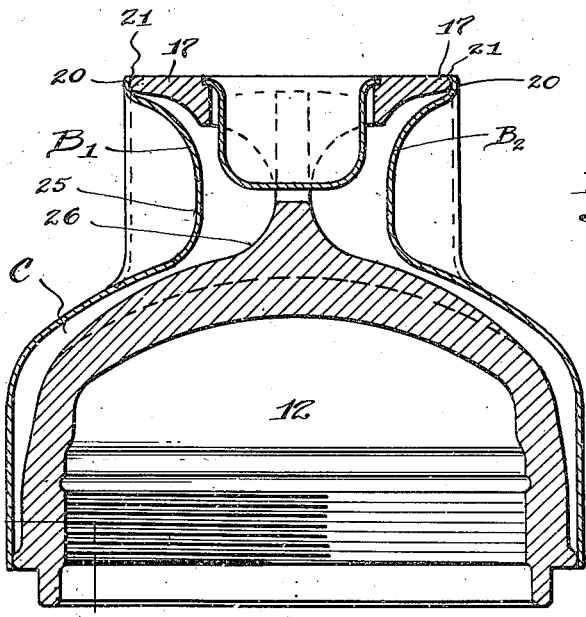
Figure 5:
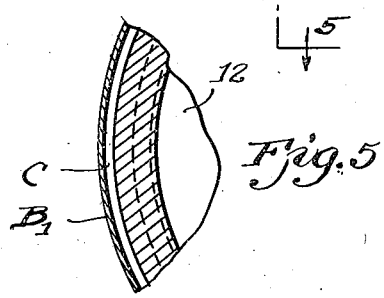
Figure 14:
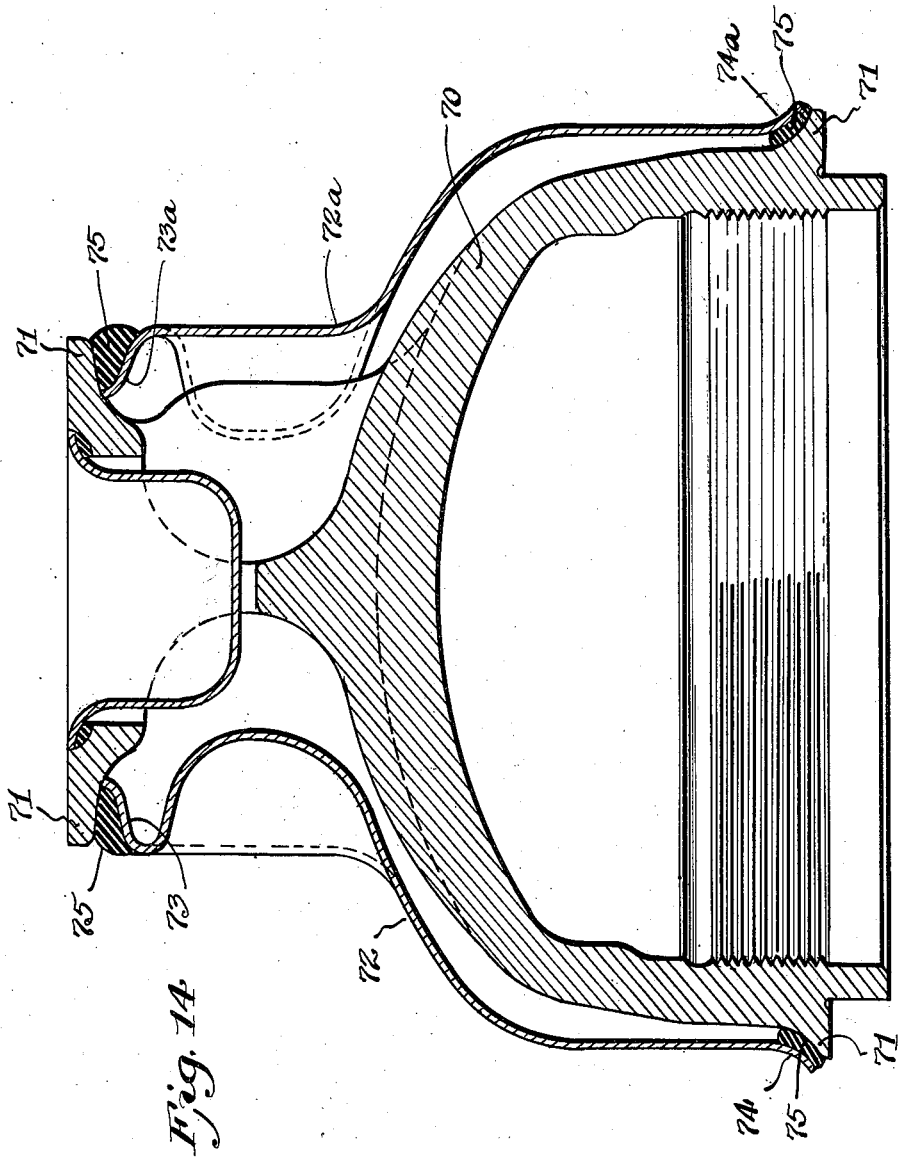

I have illustrated a preferred form of construction in connection with a liquid cooled aircraft cylinder head structure, and in the accompanying drawings, illustrating this preferred form of construction, like characters refer to like parts throughout the several views, and more particularly, Fig. 1 is a plan view of the cylinder head body structure with the sheet metal jacket stampings removed, Fig. 2 is a side elevational view thereof, Fig. 3 is a cross-sectional view taken substantially on the line 3—3 of Fig. 1 but showing the sheet metal jacket stamping secured thereon, Fig. 4 is a cross-sectional view taken substantially on the line 4—4 of Fig. 1 but showing the sheet metal jacket stampings secured to the cylinder head forging, Fig. 5 is a fragmentary detail sectional view taken substantially on the line 5—5 of Fig. 4, Fig. 6 is a horizontal view taken substantially in the plane 6—6 of Fig. 3, Fig. 7 is an enlarged detail sectional view taken substantially on the line 7—7 of Fig. 3, Fig. 8 is a fragmentary detail sectional view taken substantially on the line 8—8 in Fig. 2 and showing the detail construction of the joint between the forged cylinder head body portion and the sheet metal jacket stamping in the vicinity of the spark plug opening, Fig. 9 is a detail sectional view through the intake valve opening taken substantially on the line 9—9 of Fig. 3, Fig. 10 is a detail sectional view through a portion of the cylinder head structure with the jacket stamping secured thereto and taken substantially in the plane 10—10 of Fig. 2, Fig. 11 is a detail sectional view through a spark plug opening and showing a modified construction, Fig. 12 is a fragmentary detail sectional view of another modified construction, Fig. 13 is a fragmentary sectional view of a further modified construction, and Fig. 14 is a sectional view showing a still further modified construction in which the jacket is secured to the head with a "neoprene" gasket to which the forged head and stamping are bonded.

The improved composite cylinder head structure, illustrated in the accompanying drawings, comprises principally a forged cylinder head body portion "A" to which is secured by welding or other suitable means, a sheet metal cooling jacket, said jacket being constructed of a contour which is substantially complementary or similar to the contour of the exterior surface of the forged cylinder head body portion, said jacket and body portion cooperating to provide a cooling jacket of minimum dimensions as determined by good engineering practice.

The forged cylinder head body portion is preferably forged by suitable forging dies which meet substantially along the parting line 10, and are operable to forge an aluminum cylinder head body portion having an irregular external contour 11 that defines the inner wall surface of a cooling jacket. The combustion chamber 12 may be machined from this casting after forging, if so desired, and the counterbored portions 13 which received the valve seats may also be suitably machined in the customary manner. The intake and exhaust passages 14 and 15 respectively are preferably machined as well as the bores 16 in said head which support the valve guides 17. It will be observed that the present forging is made into a cylinder head structure with a minimum of machining since substantially the entire external surface of the forging is formed by the forging dies. Fig. 1 will illustrate in general the forged irregular contour of the external surface of the forging. This forged cylinder head body portion is provided on each side with continuous outwardly projecting ribs 17, these ribs substantially following the external contour of the body portion and being of substantially uniform height throughout their length. These ribs have outer edges or rims which are rounded and further, these ribs are off-set laterally inwardly as at 17a in the vicinity of the intake valve opening as shown in Fig. 2 for purposes which will be hereinafter described.

The sheet metal jacket structure preferably comprises a pair of sheet metal stampings B1 and B2, these stampings, if being formed with a contour which is substantially complementary to the contour of the forged cylinder head body portion and are preferably provided with peripheral flanges 20 which seat on the rounded rim of the continuous ribs 17. These flanges 20 are therefore constructed complementary to the contour of the ribs 17 and are preferably secured thereto by welding as at 21. Thus the sheet metal stampings are secured to about their peripheral edges to these ribs 17 and cooperate with the forged cylinder head body portion to provide a cooling jacket "C."

The sheet metal stampings B1 and B2 are preferably constructed substantially similar, and are more or less alike in function as well as in construction, and in view of this, it is deemed necessary to describe in detail only one of said cylinder head side stampings. These side stampings, as seen in the drawings are shaped to conform substantially with the external surface of the forged cylinder head body portion. As seen in Fig. 4, it will be observed that the stamping is recessed, as at 25, to substantially fill in a corresponding recess 26 in the forged body portion. Likewise the sheet metal stampings are provided with other suitable depressed portions 27 in Fig. 7 corresponding to depressions in the body portion, and may also be provided as shown particularly in Fig. 10, with outwardly extending recesses 28 conforming in general with outwardly projecting bosses 29, carried by the forged cylinder head body portion. If so desired the sheet metal stampings may be provided with isolated depressed portions 30 adapted to seat or abut aligned bosses carried by the forged body portion (see Fig. 10) and if so desired, these depressions 30 may be spot welded or otherwise secured to said bosses 29.

The jacket stampings are preferably of such a shape and contour as to not provide a cooling jacket around the intake passage 14, this being accomplished by permitting the rib 17 to be inwardly offset as at 17a and as shown in detail in Fig. 9. Thus the cooling jacket is preferably constructed to substantially surround only the exhaust passage 15 and the combustion chamber 12.

Particular attention is directed to the construction in the vicinity of the spark plug openings. Since these spark plug openings are opened into the combustion chamber 12 it will be seen that they must be projected transversely of the cooling jacket and must be so constructed as to prevent any leakage of the cooling fluid around the openings for the engine spark plugs. Figs. 8, 9, 11, and 12 more particularly illustrate this feature. The cylinder head body portion is thus constructed to provide spark plug bosses 40 which carry spark plug openings 41, these bosses preferably located at an intermediate portion inside of the continuous ribs 17. The opening 41 is preferably threaded as at 42 to receive a spark plug insert 43. The sheet metal stamping B is preferably recessed or formed to a shape to seat on the outer rim of these spark plug bosses 40 as at 44 and are provided with openings 45 registering with the spark plug opening 41. The recessed portion of the jacket is preferably secured to the rim of the boss, on which it seats, by suitable securing means which prevent any leakage of the cooling fluid at this joint. In Fig. 8 the joint is illustrated as being made by welding the sheet metal stamping to the rim of the boss 40 as at 46. The same construction is shown in Fig. 9 around the spark plug opening lying in the vicinity of the intake passage 14. It will be observed that this intermediate portion of the stamping which is complementary to these bosses may be recessed inwardly or outwardly in order to provide a ring like portion which seats on the rim of the spark plug bosses.

In Fig. 11 I have illustrated a mechanical joint which comprises a compressible washer 47 overlying that portion of the jacket which seats on the rim of the boss 40, the spark plug insert 43 having an outer flange 48 which clamps the compressible ring or gasket 47 to seal this joint.

Preferably, however, I find it more practical to use a mechanical joint such as is illustrated in Fig. 12. The spark plug boss 40a is provided with a spark plug opening 41a and a counterbored tapered recess 50. The outer rim of the boss 40a is preferably rounded as at 51, and the sheet metal jacket stamping B' is provided with a recess portion 52 frusto conical in shape and which is constructed and adapted to seat within the tapered counterbored recess 50 of the spark plug boss. A gland member 53 having an external tapered surface 54 is seated in the recess 50 and overlies the tapered recess portion 52 of the stamping. A spark plug insert 55 having a flange 56 is secured in the spark plug opening, so that when the insert is screwed into the threaded opening 41a, the flange 56 engages this gland member and forces same into tight contact with the recessed portion 52 of the sheet metal jacket member. The taper of the gland is preferably slightly different than the taper of the recess 50 in order that the gland will clamp the stamping with a maximum of pressure adjacent the bottom of the recess 50, this pressure diminishing in amount toward the rim of the boss so that the stamping is clamped with practically no pressure adjacent the rounded rim of the boss. In operation of an engine there is some vibration and naturally these vibrations are accentuated in a relatively thin sheet metal portion. Thus, breakage of the stamping due to vibrations or flexing of same adjacent a point where it is rigidly supported is practically eliminated by reason of a joint such as is illustrated in Fig. 12 and described above, as this joint embodying this taper permits slight flexing without disturbing the actual joint.

In Fig. 13 I have illustrated a modified construction which embodies a continuous rib 17b constructed somewhat similar to rib 17. The outer rim or edge of rib 17b is flattened as at 60 and a gasket 61 is seated thereon. The sheet metal stamping B has a flange portion 62 seating on the gasket 61 and is tightly secured to rib 17b by means of a clamping ring 63 of a shape complementary to a rib 17b and secured by means of a bolt, screw, or other fastening means 64.

In Fig. 14 a modified construction is illustrated, the forged cylinder head 70 being provided with a continuous rib or flange 71 somewhat similar to the rib 17. The sheet metal jacket stampings 72 and 72a are respectively provided with inturned flanges 73 and 73a and outwardly turned flanges 74 and 74a. A "neoprene" gasket 75 or other hard rubber or synthetic rubber gasket is bonded to the ribs 71 and also to the flanges 73, 73a and 74, 74a of the sheet metal jacket stampings, thereby providing a permanent liquid tight joint, and the inherent resilient character of the gaskets 75 serves to absorb vibrations and thereby eliminate any tendency of the joints breaking open when vibrated.

It will thus be seen that the construction described above provides a composite cylinder head structure of minimum weight, which may be economically manufactured and serviced and which is substantially stronger than a cast cylinder head. The above structure is especially adapted for use with liquid cooled aircraft engines, and it may be also observed that this construction facilitates the design of a cooling jacket of the requisite volume suitable for efficient cooling of the engine without excessive pockets where excessive amounts of cooling fluid may accumulate. Circulation of the cooling fluid through the jacket is more efficiently had with a jacket of substantially uniform thickness as it is possible with the construction to more accurately construct the passages. It may also be noted that there is no chance of having any objectionable obstructions in the cooling jacket such as is sometimes the case with cast constructions, when cores break down during the casting operation.

Although I have illustrated certain preferred forms of my invention and have described in detail preferred applications thereof, it will be apparent to those skilled in the art to which my invention pertains, that various modifications and changes may be made therein without departing from the spirit of my invention or from the scope of the appended claims.

I claim:

1. A jacketed cylinder head structure comprising a forged body portion having an exterior surface forming an inner cooling jacket wall surface and provided with oppositely disposed continuous jacket seating portions defining the periphery of a cylinder head jacket portion, and a sheet metal jacket structure formed of a plurality of sheet metal stampings each secured to the forged body portion and including peripheral flanges seated on said seating portions of said body portion.

2. A jacketed cylinder head structure comprising a forged body portion having an exterior surface forming an inner cooling jacket wall surface and provided with oppositely disposed ribs defining the periphery of a cylinder head jacket portion, and a sheet metal jacket structure formed of a plurality of sheet metal stampings each individually secured about their peripherial edges to the ribs of said forged body portion.

3. A jacketed cylinder head structure comprising a forged body portion having an exterior surface forming an inner cooling jacket wall surface of an irregular contour and provided with a continuous irregular rib defining the periphery of a cylinder head jacket portion, and a sheet metal jacket structure formed of a plurality of sheet metal stampings shaped to substantially conform to the contour of the exterior surface of said body portion said stampings each shaped to seat their peripheral edges on said ribs, and means securing said stampings to the rib of said body portion and to position the stamping in substantially uniform minimum spaced relation relative to the surface of the body portion and cooperating therewith to provide a cooling jacket.

4. A cylinder head structure comprising a forged body portion having opposed exterior surfaces forming an inner cooling jacket wall surface of an irregular contour, and a sheet metal jacket structure formed of a plurality of sheet metal stampings each shaped to substantially conform to the contour of one of the opposed exterior surfaces of said body portion, and means securing the peripheral edges of said stampings to said body portion and constructed to space the body portion of each of said stampings in substantially uniform minimum spaced relation relative to the surface of the body portion and cooperating therewith to provide a cooling jacket.

5. A cylinder head structure comprising a forged body portion having an exterior surface forming an inner cooling jacket wall surface of an irregular contour, and a sheet metal jacket structure formed of a plurality of sheet metal stampings shaped to substantially conform to the contour of the exterior surface of said body portion, said body portion having a continuous rib of substantially uniform height on each side, each of said stampings having a peripheral edge portion seating on the said ribs and secured thereto.

6. A cylinder head structure comprising a forged body portion having an exterior surface forming an inner cooling jacket wall surface of an irregular contour, and a sheet metal jacket structure formed of a plurality of sheet metal stampings, said body portion having a continuous rib on each side, each of said stampings having a peripheral flanged edge complementary to the said ribs and tightly secured thereto, the body of said stampings having a contour substantially complementary to the exterior surface of said forged body portion and supported in substantially uniform minimum spaced relation relative to the surface of said forged body portion and cooperating therewith to provide a cooling jacket.

7. A cylinder head structure comprising a forged body portion having an exterior surface forming an inner cooling jacket wall surface of irregular contour and provided with intake and exhaust passages and a combustion chamber, and a jacket structure comprising a pair of sheet metal stampings each shaped to substantially conform with the adjacent exterior surface of said body portion, said body portion provided on each side with a substantially continuous outwardly projecting rib offset laterally from the edge of the body portion in the vicinity of the intake passage, said stampings each having peripheral edge flanges seating on said ribs and secured thereto to provide a cylinder head cooling jacket substantially surrounding only said exhaust passage and combustion chamber.

8. A cylinder head structure comprising a forged body portion having an exterior side surface forming an inner cooling jacket wall surface of irregular contour and provided with intake and exhaust passages and a combustion chamber, and a jacket structure comprising a pair of sheet metal stampings each shaped to substantially conform with the adjacent exterior surface of said body portion, said body portion provided on each side with a substantially continuous outwardly projecting rib and with at least one outwardly projecting boss, said stampings each provided with peripheral edge flanges, seating on said ribs and with an intermediate recessed portion seating on said boss, said flanges and recessed portions respectively secured to said ribs and bosses.

9. A cylinder head structure comprising a forged body portion, and a sheet metal jacket structure formed of a plurality of sheet metal stampings secured in spaced relation to said forged body portion, the means securing the aforesaid body portion and stampings together consisting in an outwardly projected continuous rib having a rounded edge portion, said stampings having flanged peripheral edge portions seated on the rounded edge portions of said ribs and welded thereto.

10. A cylinder head structure comprising a forged body portion, and a sheet metal jacket structure formed of a plurality of sheet metal stampings secured to said forged body portion, said body portion having a recessed boss having a spark plug opening, said stamping having a recessed portion seating in the recess of said boss, a tapered gland member overlying said recessed portion of the stamping, and a spark plug flanged insert secured in said spark plug opening and clamping said tapered gland member underneath said insert flange to tightly secure the stamping to the boss.

11. A cylinder head structure comprising a forged body portion, and a sheet metal jacket structure formed of a plurality of sheet metal stampings secured to said forged body portion, said body portion having a recessed boss having a spark plug opening, said stamping having a recessed portion seating in the recess of said boss, a tapered gland member overlying said recessed portion of the stamping, and a spark plug flanged insert secured in said spark plug opening and clamping said gland member underneath said insert flange to tightly secure the stamping to the boss, the recessed portion of said boss being constructed with tapered side walls substantially complementary to the taper of said gland member.

12. A cylinder head structure comprising a forged body portion, and a sheet metal jacket structure formed of a plurality of sheet metal stampings secured to said forged body portion, said body portion having a recessed boss having a spark plug opening, said stamping having a recessed portion seating in the recess of said boss, a tapered gland member overlying said recessed portion of the stamping, and a spark plug flanged insert secured in said spark plug opening and clamping said gland member underneath said insert flange to tightly secure the stamping to the boss, the recessed portion of said boss being constructed with tapered side walls slightly more divergent that the taper of the gland member whereby to clamp the stamping with maximum pressure adjacent the bottom of the boss recess.

13. A cylinder head structure comprising a forged body portion, and a sheet metal jacket structure formed of a plurality of sheet metal stampings secured to said forged body portion, said body portion having a recessed boss having a spark plug opening, said stamping having a recessed portion seating in the recess of said boss, a tapered gland member overlying said recessed portion of the stamping, and a spark plug flanged insert secured in said spark plug opening and clamping said gland member underneath said insert flange to tightly secure the stamping to the boss, the recessed portion of said boss being constructed with tapered side walls slightly more divergent than the taper of the gland member whereby to clamp the stamping with maximum pressure adjacent the bottom of the boss recess, the peripheral outer edges of said boss recess being rounded whereby to facilitate flexing of the sheet metal stamping in order to lessen the tendency of said stamping to fracture when stressed.

14. A cylinder head structure comprising a forged body portion, a sheet metal jacket structure formed of a plurality of sheet metal stampings cooperating with said forged body portion and having a contour substantially conforming to the general contour of said body portion, and means securing said stampings to the forged body portion comprising a synthetic rubber gasket bonded to both said body portion and said stampings.

15. A cylinder head structure comprising a forged body portion, a sheet metal jacket structure formed of a plurality of sheet metal stampings cooperating with said forged body portion and having a contour substantially conforming to the general contour of said body portion, said body portion having ribs, said stampings having flanges substantially complementary to said ribs, and means securing said stampings to the forged body portion comprising a yielding gasket structure permanently bonded to both said ribs and flanges.

16. A cylinder head structure comprising a forged body portion, a sheet metal jacket structure formed of a plurality of sheet metal stampings cooperating with said forged body portion and having a contour substantially conforming to the general contour of said body portion, said body portion having ribs, said stampings having flanges substantially complementary to said ribs, and means securing said stampings to the forged body portion comprising a yielding "Neoprene" gasket structure permanently bonded to both said ribs and flanges.

17. A cylinder head structure comprising a forged body portion, a sheet metal jacket structure formed of a plurality of sheet metal stampings cooperating with said forged body portion and having a contour substantially conforming to the general contour of said body portion, said body portion having ribs, said stampings having flanges substantially complementary to said ribs, and means securing said stampings to the forged body portion comprising a yielding ring like "Neoprene" gasket structure permanently bonded to both said ribs and flanges.

18. A jacketed cylinder head structure comprising a forged body portion whose intermediate parting line defines opposed surface portions, each forming an inner wall of a cooling jacket portion, a sheet metal jacket structure comprising at least a pair of sheet metal stampings constructed substantially complementary to said surface portions, and means securing each stamping to opposite sides of said forged body portion, said securing means comprising peripheral flange portions seated on said forged body portion and cooperating therewith to define the peripheral limits of opposed cylinder head jacket portions disposed respectively on opposite sides of said intermediate parting line of said forged body portion.

19. A jacketed cylinder head structure comprising a forged body portion whose intermediate parting line defines opposed surface portions, each forming an inner wall of a cooling jacket portion, a sheet metal jacket structure comprising at least a pair of sheet metal stampings, and means securing each stamping to opposite sides of said forged body portion, said securing means comprising peripheral flange portions seated on said forged body portion and cooperating therewith to define the peripheral limits of opposed cylinder head jacket portions disposed respectively on opposite sides of said intermediate parting line of said forged body portion.

CARL F. BACHLE.